March 20, 1945.  G. E. MAILLAT  2,371,904
PORTABLE STROBOSCOPIC DEVICE FOR CHECKING ELECTRIC METERS
Filed May 29, 1941  3 Sheets-Sheet 1
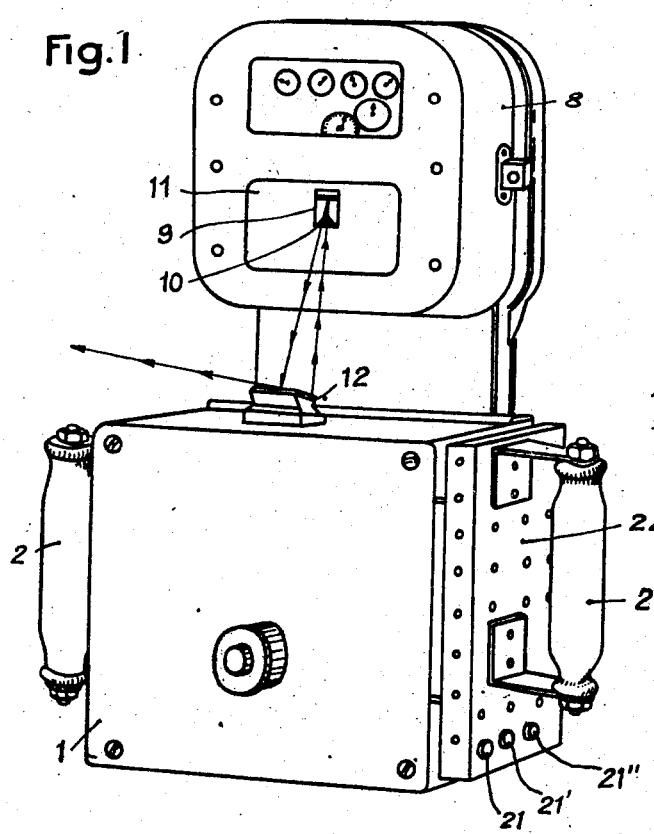
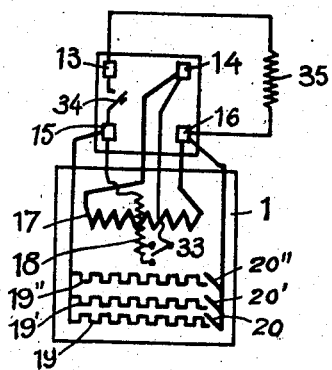
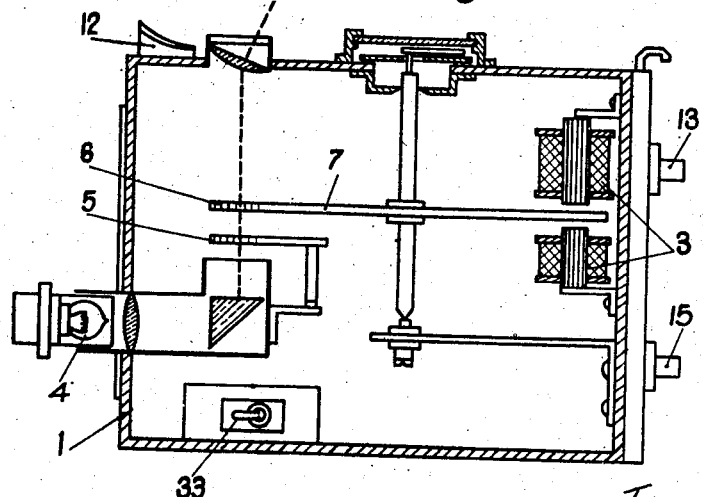

March 20, 1945. G. E. MAILLAT 2,371,904
PORTABLE STROBOSCOPIC DEVICE FOR CHECKING ELECTRIC METERS
Filed May 29, 1941 3 Sheets-Sheet 2

Inventor:
G. E. Maillat
By: Glascock Downing + Seebold

March 20, 1945.                G. E. MAILLAT                2,371,904
         PORTABLE STROBOSCOPIC DEVICE FOR CHECKING ELECTRIC METERS
                        Filed May 29, 1941         3 Sheets-Sheet 3

Patented Mar. 20, 1945

2,371,904

UNITED STATES PATENT OFFICE 2,371,904

PORTABLE STROBOSCOPIC DEVICE FOR CHECKING ELECTRIC METERS

Gustave Ernest Maillat, Voisins-le-Bretonneux par Trappes, France; vested in the Alien Property Custodian Application May 29, 1941, Serial No. 395,893
In France June 9, 1939

7 Claims. (Cl. 175—183)

In Patent 2,123,115, the author of the present invention has described a stroboscopic device adapted for the adjustment of subscribers' electric meters at the subscribers' premises. This apparatus consists in a case which is fixed, for the adjusting operation, under the meter to be checked. The case contains a standard meter which, with a source of light and an optical system, produces the stroboscopic illumination of the subscriber's meter, together with electrical circuits necessary for the comparison of the two meters. These circuits lead to contact plugs or studs carried by the case, which are brought into contact, upon performing the adjusting operation, with other contact pieces arranged on a panel permanently fixed below the meters to be checked and to which the case is fixed temporarily for performing the operation.

In the embodiments described in this patent, the comparison circuits contained in the case were established for permitting a precise adjustment of the meters under all loads as well as under various power factors. This led to a comparatively heavy and too cumbersome apparatus for the mere use as a checking apparatus.

The present invention concerns an alternative embodiment of this portable stroboscopic device, designed with the view of permitting a monthly check of the correct adjustment of the standardised subscribers' meters on low voltage means (for instance 110 volts mains) by the staff employed for taking periodically the meters' readings. For this purpose, it is necessary to provide a portable apparatus which is much lighter and less cumbersome than that provided in the cited patent, and which will further considerably reduce the time required for effecting a checks, while demanding from the operator no special technical instruction.

The device according to the present invention is characterised by the fact that the electric checking parts consist on one hand in a small number of resistances which may be inserted into the circuit of the current coils of the two meters and which correspond to the usual loads of the meter to be checked, and, on the other hand, in means for obtaining rapidly, during the comparing operation, the speeds of the standard meter corresponding to the upper and lower permissible limits (for instance +3% and —3%) of the misadjustment.

According to another characteristic of the invention, which is a consequence of the first, the panel carrying the contacts which are fixed permanently below the meters to be checked and are connected to the checking parts of the stroboscopic apparatus, is constituted by the subscriber's main two-pole switch.

By way of example one has described below and represented schematically on the annexed drawings one embodiment of the device according to the present addition.

Figure 1 is a perspective view of the apparatus in the operating position,

Figure 2 shows the stroboscopic apparatus in vertical section,

Figure 4:
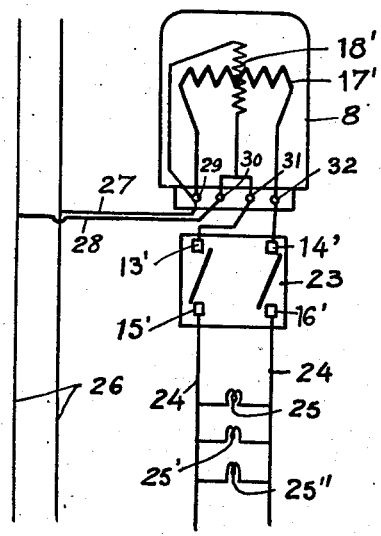
Figure 7:
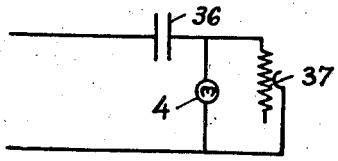
Figure 8:
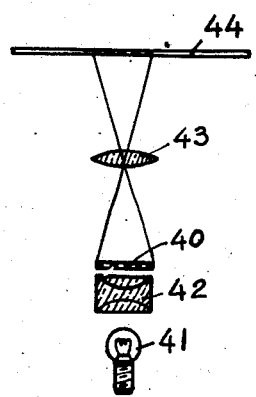
Figure 9:
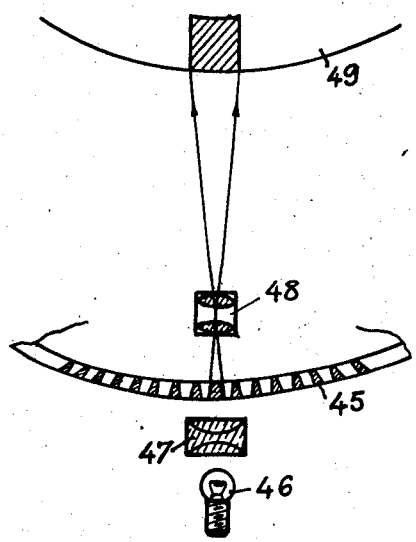
Figure 5:
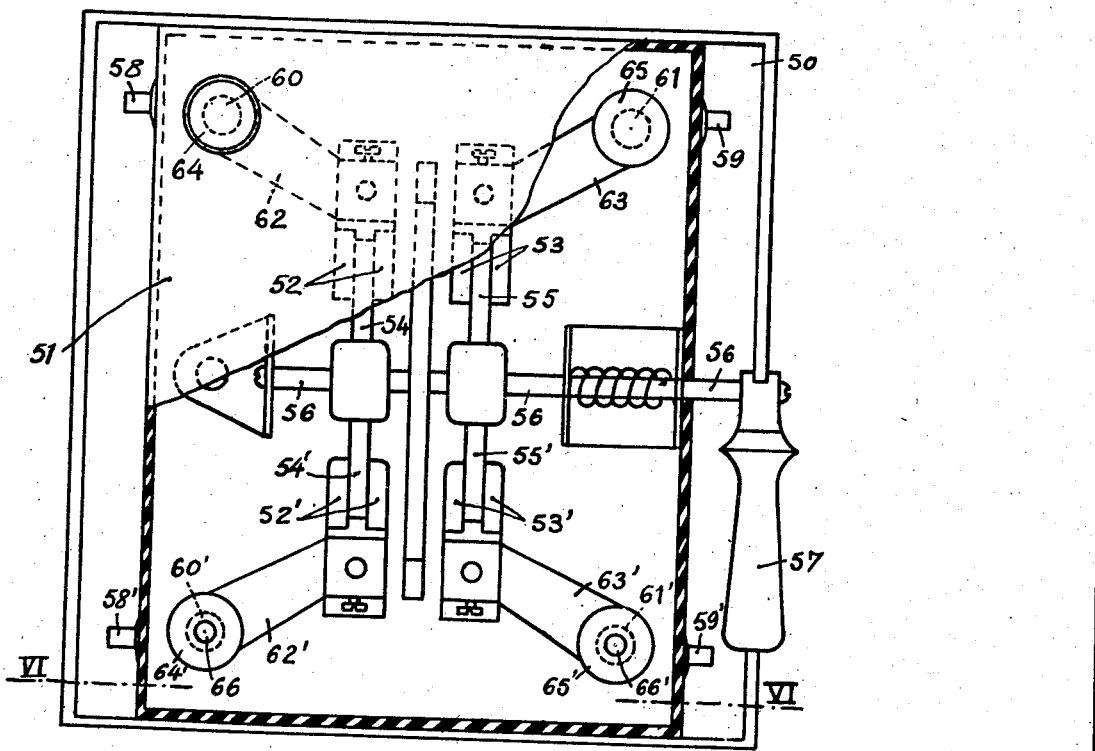
Figure 6:
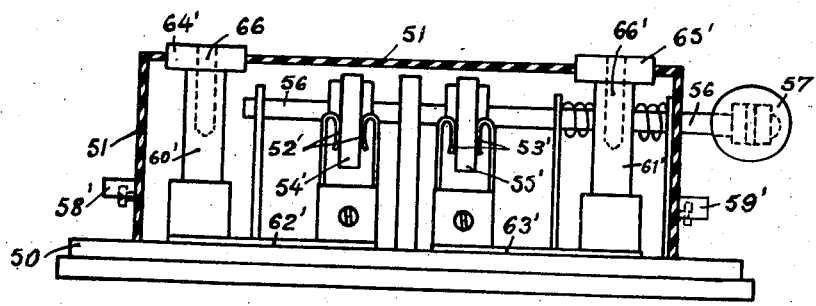

Figures 3 and 4 represent the wiring connections of the checking apparatus and the meter to be verified, Figures 5 and 6 are, in plan view and transverse section respectively, a subscriber's two-pole switch adapted for receiving the stroboscopic apparatus, Figure 7 is a diagram for the supply of the lamp contained in the apparatus, and Figures 8 and 9 show schematically two different optical devices giving the required beam of light.

Similarly to the device according to the preceding invention, the device of the present invention comprises a portable case 1 provided with handles 2, 2' and containing a standard meter 3, a source of light 4 projecting a beam of light through a fixed comb 5, preferably constituted by a film carrying a picture of a system of teeth, and a second similar film 6, fixed to the edge of the disc 7 of the standard meter. This beam of light is projected through a window 9 in the label plate 11 of the meter to be checked and thence onto the lower face of the meter disc which carries marking lines. The case 1 is fixed, for effecting the check, below the meter 8 to be checked, by means of contact plugs or studs 13, 14, 15, 16 (Figures 2 to 4) fixed to the case 1, to which are connected the standard meter and the various checking parts and which come into contact with corresponding parts arranged on a panel fixed permanently below the meter 8. The displacement of the marking lines of the disc of meter 8 is observed by reflection in the magnifying mirror 12 provided on the case 1, or by means of any other suitable optical device such as a rectangular prism fitted with convex lenses.

As shown in the wiring diagram of Figure 3, the case 1 comprises, apart from the optical system, the current and voltage windings 17 and 18 of the standard meter, a high resistance 35 and a number of, for instance three other resistances 19, 19', 19" which may each be connected separately, or two or three in parallel, to the terminals of the standard meter by means of switches 20, 20', 20" actuated from the outside by push-knobs 21, 21', 21" (Figure 1) provided on the case 1. These resistances are heat-insulated or ventilated in order not to harm, by radiation of heat into the case 1, the precision of the standard meter. To this effect, the resistances are arranged in a flat apertured box 22 (Figure 1) fixed to one side of the case 1 without contact with the latter, in order to leave an interval which will protect the case against any undue heating. Besides, the switches 20, 20', 20" may be provided with an automatic opening device in case of excessive heating, comprising for instance bi-metal strips. These resistances are chosen in a manner to correspond, according as to whether there is only one or a certain number of them connected in parallel, to certain usual loads of the subscriber's meter, as for instance a low load, a medium load and full load.

The windings of the standard meter are connected, as indicated above, to four plugs or studs 13, 14, 15, 16 provided on the case 1 and correspond to a set of similar contact pieces 13', 14', 15', 16' constituting the four studs of the subscriber's main two-pole switch 23 (Figure 4) which connects the meter 8 in the usual manner to the subscriber's inside installation 24 comprising for instance lamps 25, 25' . . . or other utilities. It will be seen that when the contacts 13—13', 14—14', 15—15', 16—16' are established by the application of case 1, with the switch 23 in the operating position, the voltage windings 18, 18' of both meters are connected in parallel on the mains 26 by 27, 29, 18', 30 and 28, and by 27, 29, 17', 14'—14, 33, 18, 15—15', 13', 31, 30 and 28, while the current windings 17—17' are connected in series with one, two or three of the resistances 19, 19', 19" (in parallel) (circuit 27, 29, 17', 14'—14, 17, 16, 20", 19" for instance, 15—15', 13', 31, 30, 28), this resistance 19" for instance being connected in parallel to the subscriber's circuit, so that the checking may be effected without disturbing the latter. It will be seen that it is owing to the arrangement adopted for the electric checking connections that it is possible to connect the apparatus to the subscriber's main two-pole switch.

To this end, the subscriber's main two-pole switch (Figures 5 and 6), which comprises, as usual, a base plate 50, an insulating lid 51, four jaws 52, 52' and 53, 53' and two blades 54, 54' and 55, 55' mounted on an axis 56 actuated by a handle 57, is further provided with four pins 58, 58', 59, 59' fixed on the insulating lid 51 and serving the purpose of fixing the case 1 to the switch. The switch is further provided with four posts 60, 60', 61, 61' fixed to the base plate 50 and connected respectively, by means of conductors 62, 62', 63, 63', to the switch jaws 52, 52', 53, 53'. The upper ends of these posts, which protrude from the insulating lid 51 through apertures provided to this effect in the latter, carry enlarged heads 64, 64', 65, 65' serving as contact pieces and against which will come to lie the four contact pieces of case 1 for instance in the form of brass springs, blades or brushes. In case the contact pieces of the stroboscope case are constituted by plugs, the posts 60, 60', 61, 61' carry corresponding apertures 66, 66' (Figure 6) in a manner to form sockets for the said plugs. The tops of posts 60, 60', 61, 61' may of course also not protrude over the lid 51 and the contact pieces of the case penetrate into the latter.

In the embodiment provided by the present invention, the checking of the misadjustment of the meter under check (with its sign + or —) is effected by varying the speed of the standard meter from one to the other limit of the permissible misadjustment, by means of a switch 32 supplying its voltage coil through one or the other of two tappings, one of them corresponding to the lower limit of the misadjustment, and the other to the upper limit. The meter of the device being, for instance, adjusted to the predetermined upper limit of inaccuracy (3% fast) while the lower limit (3% slow) is given by the other position of switch 32, the operator will proceed as follows. Holding the case 1 in one hand, he will fix the checking apparatus to the subscriber's two-pole switch 23 by holding the apparatus for instance with his two hands by the handles 2, 2', then insert it in the subscriber's load circuit by opening said switch if it is not already opened. At this moment, the lamp of the optical system will light up and the standard meter will rotate. The operator will merely have to observe in the magnifying glass 12 the image of the marks carried by the disc of the subscriber's meter under check, and then, by actuating in succession the corresponding push-knobs, insert in the circuit any one or combination of the said resistances to give the usual loads, and check, by actuating the switch 32, if the speed of the subscriber's meter is comprised between the two limiting values of the standard meter.

The arrangement of the stroboscopic apparatus and the rapid method of verification employed permit the use of resistances of the type generally employed in electric irons, for the resistances 19, 19', 19" serving as test loadings for the meters. Thus each resistance will consist for instance in a resistant strip, about 5 feet long, wound on a mica sheet inserted between two other insulating mica sheets somewhat larger than the first, the latter sheets being held between two aluminium plates riveted to one another and giving the assembly the required mechanical protection. Resistances of this type are here very advantageous by reason by their very low weight; they have up to the present generally been used for giving a rapid and strong heating, which might here seem to prove harmful. Their use for the present purpose is possible here only because of the fact that the time required for performing a stroboscopic measurement; i. e., the time during which the resistances are actually in circuit, is very short, say about 10 seconds. The amount of heat to be dissipated is consequently very small and it will therefore suffice, in practice, to arrange these test resistances 19, 19', 19", as shown in Figure 1, in an apertured casing 22 fixed to the stroboscope case 1, casing and case being separated from one another by a small interval of air of about ¼ inch.

Apart from the stroboscopic checks indicated above, it will also be required to check the meter for correct starting under very low load conditions.

Accordingly switch 34 (see Fig. 3) may be closed when the subscriber's main switch is open with the result that a resistance 35 is connected in the current circuit of the meter being tested.

Resistance 35 corresponds, for example, to 1/60 of the rated load which is, illustratively, the minimum starting load.

With the main switch 23 open and switch 34 of the case also open, the circuit will then be the following: 26, 27, 29, 17', 32, 14', 14, 17, 16, 35, 13, 13', 31, 30, 28, 26. The check of correct starting is effected through the means of the optical system.

The lamp of the stroboscope device could be supplied by a battery arranged in the case, but, with the same view of decreasing the weight of the apparatus, which is an essential condition for making it practical in use, it is preferable to supply the lamp directly from the A. C. mains. The fact that the stroboscopic device is placed immediately below the meter under check, at a small distance from the latter, and that the disc of the latter, especially its lower face, which receives the stroboscopic interrupted luminous flux, is placed in nearly complete darkness, permits the use of a very weak source of light, for instance the bulb of a pocket lamp, consuming 0.5 amp. under 3.5 volts. Such a lamp will produce practically no heating in the case and thus will not disturb in any way the precision of the standard meter. There are various arrangements for supplying such a lamp from the mains, as especially a transformer, but the comparatively large weight of the latter would make the case unnecessarily heavy, a condition which it is absolutely necessary to avoid in this case. A resistance could also serve the purpose, but it would heat the case, and such heating is to be avoided, and further consume a comparatively large current.

According to one characteristic of the present invention, one will preferably use, for supplying this lamp 4 (Figure 7), a condenser 36 connected in series with the lamp, which will thus operate on the charging and discharging current of the condenser. An adjustable resistance 37, in parallel with the lamp, permits the adjustment of the lamp voltage.

Owing to the low value of the illumination, it is necessary to take special precautions in order to obtain a sufficiently sharp stroboscopic effect, i. e., sufficiently sharp cuts of the luminous flux, especially if the disc of the standard meter producing these cuts rotates very slowly under weak loads. Thus, for instance, an 8 to 10 cm. diameter disc may carry, around its periphery, 1000 lines, i. e., about 30 lines per cm. periphery. According to the cited patent, the luminous flux passes in succession through a fixed comb and the teeth of the rotating disc of the standard meter. Such a device, however, cannot give complete occultations, even if the comb and disc are very close to one another, because, owing to the dimensions, which are not negligible here, of the source of light, there will always pass a certain amount of diffuse light, which will be sufficient for decreasing to a large extent the stroboscopic effect. For remedying this drawback, the comb teeth and the teeth on the disc of the standard meter are made, according to the present invention, as the author has already indicated previously, by means of a circular film carrying, at the required scale, a photographic copy, as fine and sharp as it is desired, of teeth or simply of a scale, at first drawn at a larger scale, and the image of the fixed comb is then projected upon the film forming the teeth on the disc of the standard meter. In this way, the fixed teeth (image) and the moving teeth (object) lie in the same plane and the interruptions of the beam are consequently perfect. This device is shown schematically in Figure 8, which is an elevational view of this part of the apparatus.

The film carrying the photographed teeth 40 and constituting the fixed comb is illuminated from below by the lamp 41 by means of the collimator 42. Its image is formed by a lens 43 upon the photographed teeth-carying film 44 forming the edge of the disc of the standard meter, this image having exactly the same dimensions as the film teeth 44. Thus, when the movable teeth or scale 44 comes to lie in a position in which its slots are opposite the teeth of the image, the luminous flux will be completely interrupted and the stroboscopic effect excellent.

In certain cases, it may be sufficient to use a simplified projection device. The image of the photographed teeth-carrying film forming the edge of the disc of the standard meter is then projected at an enlarged scale by the optical system under the disc of the meter under check. This film 45 (Figure 9) is illuminated from below by a lamp 46 which may be provided with a collimator 47. An optical system 48 projects the image of this film 45 under the disc 49 of the meter under check. There will thus be formed, beneath the lower face of the disc of the meter under check, a region illuminated intermittently with a frequency equal to the travel frequency of the lines or teeth of the disc of the standard meter in the luminous beam.

What we claim is:

1. Stroboscopic device for checking the electric meters of low voltage mains subscribers, comprising a graduation provided on the edge of the lower face of the disc of the meter to be checked, a portable case containing a source of light, an optical projection system projecting a beam of light upon the lower, divided face of the disc of the meter to be checked, a standard meter with its disc provided on its edge with means for periodically interrupting the beam of light projected by said optical system, electric comparison members consisting of a small number of individual resistance units corresponding to a certain number of usual loads of the meter, and means including individual switch units associated respectively with each of said individual resistance units for connecting these individual resistance units in series with the current winding of said standard meter, contact pieces arranged on the case and to which are connected the windings of the standard meter, a panel fixed below the meter to be checked and provided with contact pieces connected to the windings of the meter to be checked and corresponding to those of the case for connecting the two meters to the distribution mains, and with members for fixing said case to the meter to be checked, means in this case for causing the standard meter to rotate, during the check, at the speeds corresponding to the upper and lower permissible values of inaccuracy, these means comprising two tappings on the voltage winding of the standard meter and a switch for connecting one of these tappings to the mains.

2. Stroboscopic device for checking the electric meters of low voltage mains subscribers, comprising a graduation provided on the edge of the lower face of the disc of the meter to be checked, a portable case containing a source of light, an optical projection system projecting a beam of light upon the lower, divided face of the disc of the meter to be checked, a standard meter with its disc provided on its edge with means for periodically interrupting the beam of light projected by said optical system, electric comparison members consisting of a small number of individual resistance units corresponding to a certain number of usual loads of the meter, and means including individual switch units associated respectively with each of said individual resistance units for connecting these individual resistance units in series with the current winding of said standard meter, contact pieces arranged on the case and to which are connected the windings of the standard meter, a panel fixed below the meter to be checked and provided with contact pieces connected to the windings of the meter to be checked and corresponding to those of the case for connecting the two meters to the distribution mains, and with members for fixing said case to the meter to be checked, two tappings on the voltage winding of the standard meter, corresponding to speeds 3% above and 3% below the speed corresponding exactly to the load under test.

3. Stroboscopic device for checking the electric meters of low voltage mains subscribers, comprising a graduation provided on the edge of the lower face of the disc of the meter to be checked, a portable case containing a source of light, an optical projection system projecting a beam of light upon the lower, divided face of the disc of the meter to be checked, a standard meter with its disc provided on its edge with means for periodically interrupting the beam of light projected by said optical system, electric comparison members consisting of a small number of resistances corresponding to a certain number of usual loads of the meter, and means for connecting these resistances in series with the current winding of the latter, four contact pieces arranged on the case and to which are connected the windings of the standard meter, a main two-pole switch connected to the subscriber's circuit and arranged below the meter to be checked, four contact pieces arranged on this switch, respectively connected to the terminals of the latter and corresponding to the four contact pieces of the case for connecting the two meters to the mains, members arranged on the switch for fixing the case, means provided in the latter for causing the standard meter to rotate, during the check, at the speeds corresponding to the upper and lower permissible values of inaccuracy.

4. Stroboscopic device for checking the electric meters of low voltage mains subscribers, comprising a graduation provided on the edge of the lower face of the disc of the meter to be checked, a portable case containing a source of light, an optical projection system projecting a beam of light upon the lower, divided face of the disc of the meter to be checked, a standard meter with its disc provided on its edge with means for periodically interrupting the beam of light projected by said optical system, electric comparison members consisting of a small number of resistances corresponding to a certain number of usual loads of the meter, and means for connecting these resistances in series with the current winding of the latter, four contact pieces arranged on the case and to which are connected the windings of the standard meter, a main two-pole switch connected to the subscriber's circuit, arranged below the meter to be checked and comprising a base plate and an insulating lid provided with four apertures, members fixed on this insulating lid for fixing the portable case, four posts fixed to the base plate of the switch and protruding from the lid through the said apertures, means for connecting these four posts to the four terminals of the switch respectively, contact pieces carried by these posts and corresponding to those of the case for connecting the two meters to the mains when the case is fixed to the lid of the switch, means in this case for causing the standard meter to rotate, during the check, at the speeds corresponding to the upper and lower permissible values of inaccuracy.

5. Stroboscopic device for checking the electric meters of low voltage mains subscribers, comprising a graduation provided on the edge of the lower face of the disc of the meter to be checked, a portable case containing a source of light, an optical projection system projecting a beam of light upon the lower, divided face of the disc of the meter to be checked, a standard meter with its disc provided on its edge with means for periodically interrupting the beam of light projected by said optical system, electric comparison members consisting of a small number of resistances corresponding to a certain number of usual loads of the meter, and means for connecting these resistances in series with the current winding of the latter, contact pieces arranged on the case and to which are connected the windings of the standard meter, a panel fixed below the meter to be checked and provided with contact pieces connected to the windings of the meter to be checked and corresponding to those of the case for connecting the two meters to the distribution mains, and with members for fixing said case to the meter to be checked, means in this case for causing the standard meter to rotate, during the check, at the speeds corresponding to the upper and lower permissible values of inaccuracy, a high resistance arranged in the case for checking the correct starting up of the meter under check, and means for connecting this high resistance in series with the current windings of the meter under check and of the standard meter.

6. Stroboscopic device for checking the electric meters of low voltage mains subscribers, comprising a graduation provided on the edge of the lower face of the disc of the meter to be checked, a portable case containing a source of light consisting in a very low voltage and low powered electric lamp connected to the supply mains, a condenser connected in series with the lamp, an adjustable resistance connected in parallel with the lamp, an optical projection system for projecting a beam of light upon the lower, divided face of the disc of the meter to be checked, a standard meter with its disc provided on its edge with means for periodically interrupting the beam of light projected by said optical system, electric comparison members consisting of a small number of resistances corresponding to a certain number of usual loads of the meter, and means for connecting these resistances in series with the current winding of the latter, contact pieces arranged on the case and to which are connected the windings of the standard meter, a panel fixed below the meter to be checked and provided with contact pieces connected to the windings of the meter to be checked and corresponding to those of the case for connecting the two meters to the distribution mains, and with members for fixing said case to the meter to be checked, means in this case for causing the standard meter to rotate, during the check, at the speeds corresponding to the upper and lower permissible values of inaccuracy.

7. Stroboscopic device for checking the electric meters of low voltage mains subscribers, comprising a graduation provided on the edge of the lower face of the disc of the meter to be checked, a portable case containing a source of light, a standard meter provided with a toothed disc, a fixed toothed screen arranged on the path of the beam of light between the source of light and the disc of the standard meter, an optical system arranged between the fixed screen and the disc of the standard meter for projecting, in the plane of the teeth of the disc, an image of the teeth of the fixed screen onto the disc of the meter to be checked, electric comparison circuits, means for connecting these circuits to the windings of the standard meter, contact pieces arranged on the case and to which are connected the windings of the standard meter and the comparison circuits, a panel fixed below the meter to be checked and provided with members for fixing the case and with contact pieces connected to the windings of the meter to be checked and corresponding to those of the case for connecting both meters to the supply mains, and means for varying the speed of the standard meter.

GUSTAVE ERNEST MAILLAT.